United States Patent Office 3,452,201
Patented June 24, 1969

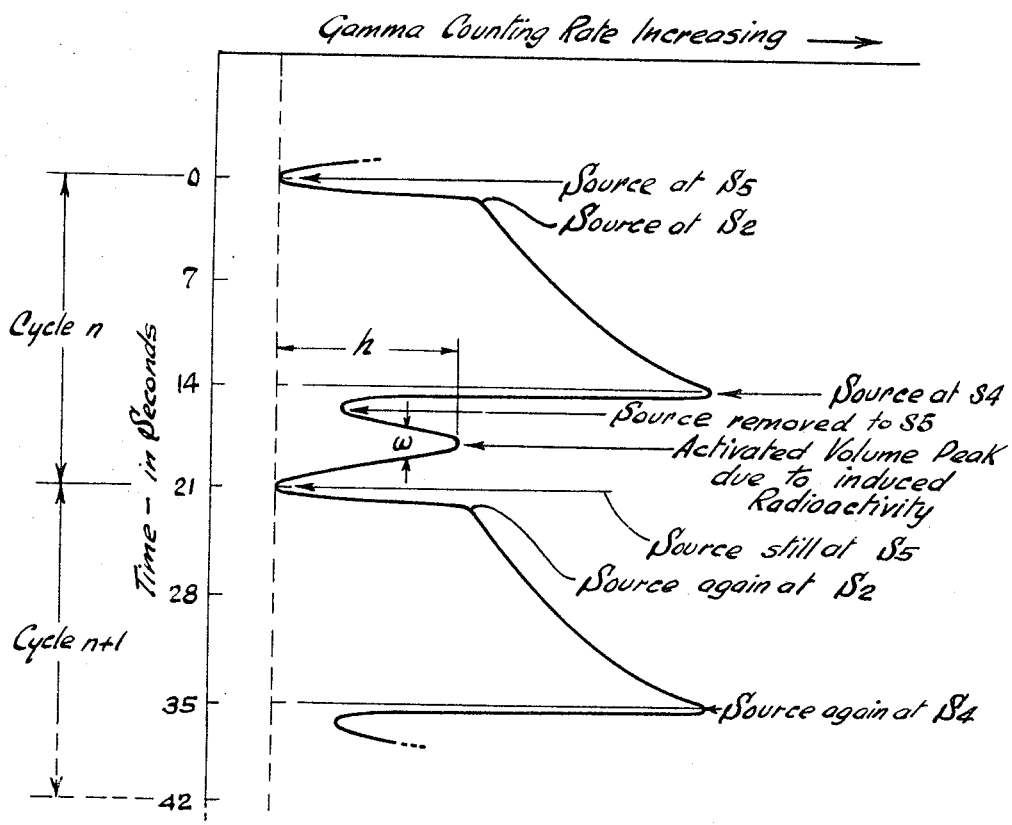
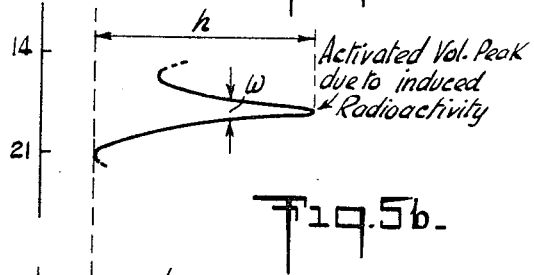
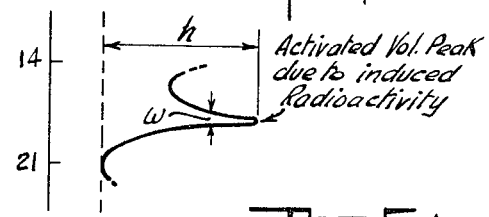
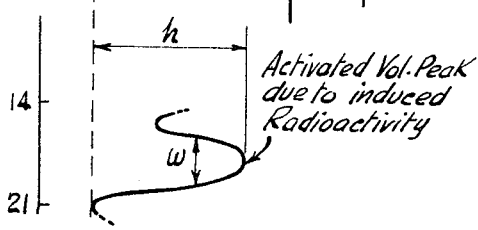
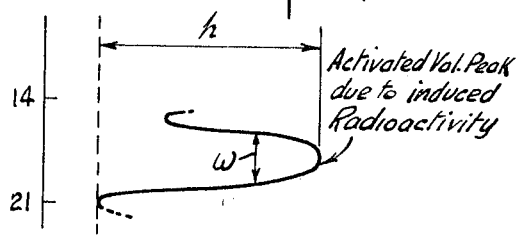

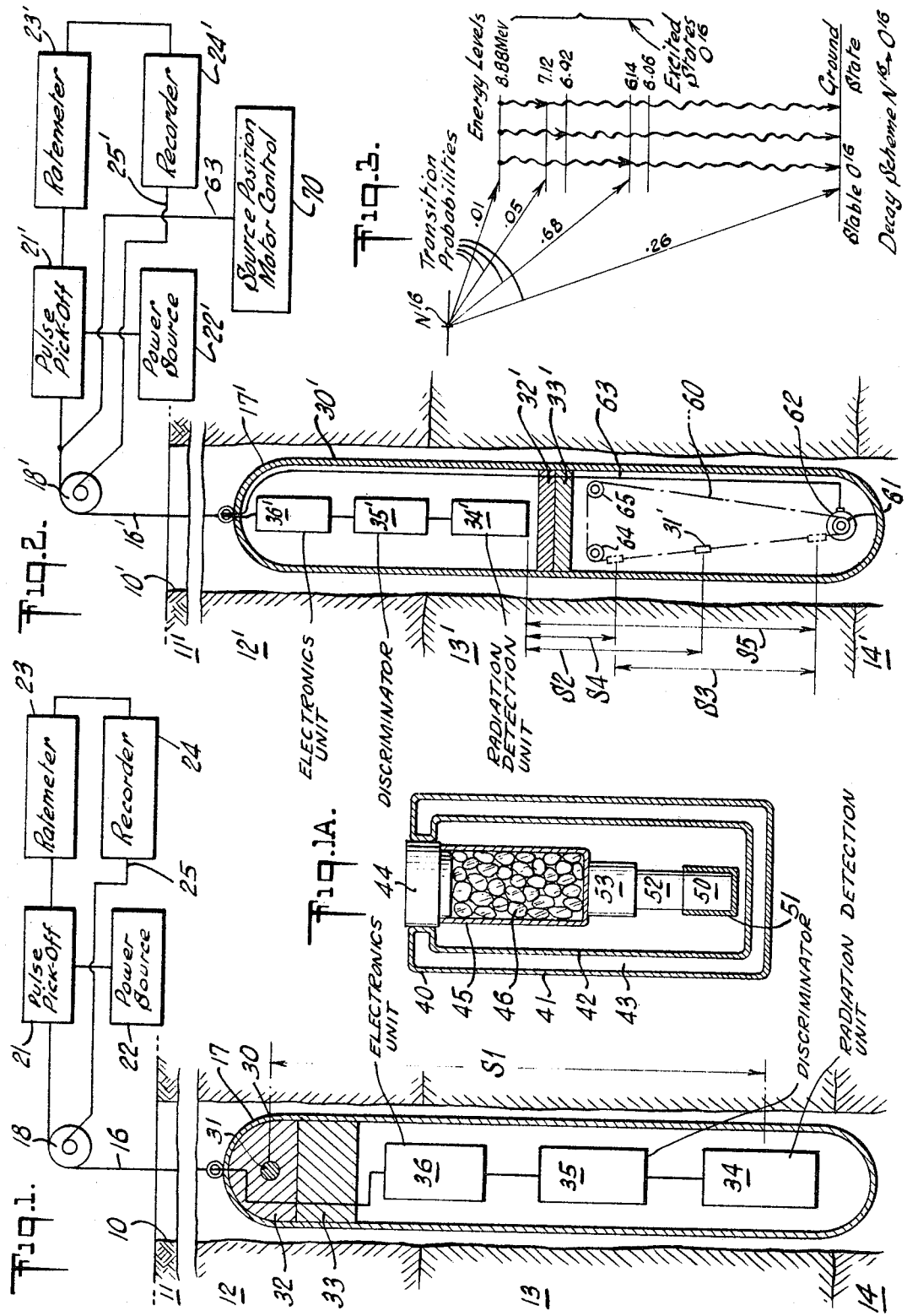

3,452,201
ENERGY LEVEL SELECTIVE ACTIVATION RADIOACTIVITY ANALYSIS SUITABLE FOR BOREHOLE LOGGING
Hugh E. Hall, Jr., Houston, Tex., assignor to Texaco Inc., New York, N.Y., a corporation of Delaware
Filed Oct. 16, 1964, Ser. No. 404,444
Int. Cl. G01t 1/16; G21h 5/00; H01j 39/32
U.S. Cl. 250—83.3      19 Claims

ABSTRACT OF THE DISCLOSURE

A method of analyzing a sample of material for the presence of certain constituents by irradiating the sample with fast neutrons having energies above 3 million electron volts in order to activate fluorine 19 involving the selective activation of fluorine 19 by limiting the maximum energy of the irradiating neutrons to approximately 10 million electron volts. The delayed activation gamma radiation resulting from said neutron activation is selectively detected to the exclusion of prompt gamma radiation and lower energy gamma radiation of about 4 million electron volts which may be present. Advantageously, the detection step is carried on after removal of the irradiating neutron source either by switching off or physically removing it after activation of the fluorine 19. The invention is advantageously useful in neutron well logging. Apparatus for carrying out such well logging comprises a logging instrument including a source of neutrons within the specified range of 3 to 10 million electron volts, together with a gamma radiation detector sensitive to neutrons only above a range of about 4 million electron volts and means for selectively changing the spacing between the radiation source and detector in a direction along the axis of a borehole so that the detector can be positioned beyond the influence of the source during irradiation and near the sample during the detection interval.

---

The present invention relates generally to the analysis of material for the presence of certain constituents contained therein. More particularly, the invention is concerned with such analysis by irradiating a sample of the material with neutrons and detecting gamma radiation selectively indicative of fluorine. The invention is of particular utility with respect to novel methods and apparatus for geological analysis involving logging of boreholes in the earth.

It is a general object of the present invention to provide improved methods for determining the presence of fluorine in a sample of material such as an earth sample through irradiation thereof with neutrons and selective detection of penetrative gamma radiation emanating therefrom and which is indicative of fluorine.

It is a further object of the present invention to provide improved apparatus for conducting well logs to determine the presence of fluorine in the earth formations along the traverse of a borehole by irradiation of such earth formations with neutrons and selective detection of gamma radiation resulting therefrom and which is indicative of fluorine.

It is known to analyze materials for the presence of certain constituents therein by irradiation of such material with neutrons to activate the constituents so that gamma radiation is emitted therefrom and which is detected as an indication of the sought-for constituent in the irradiated material. Such techniques are shown for example in certain U.S. patents. For example, neutron activation analysis for determining the presence of chlorine is disclosed in U.S. Patent 2,744,199—Juterback et al. U.S. Patent 2,463,733—Albaugh and U.S. Patent 2,665,-385—Herzog disclose neutron activation analysis for sodium and chlorine in well logging. U.S. Patent 2,996,-618—Goodman et al. discloses a neutron logging system for logging materials including fluorine. However, Goodman fails to disclose selective neutron activation and detection of fluorine as hereinafter described and claimed.

Briefly stated in accordance with the present invention, a sample of material to be analyzed, such as a sample of earth material, is irradiated with fast neutrons having energies above 3 million electron volts, hereinafter abbreviated mev., in order to activate fluorine 19 which is the only natural isotope of fluorine. The method further contemplates the selective activation of fluorine 19 by limiting the maximum energy of the irradiating neutrons to approximately 10 mev. The present method further contemplates the selective detection of gamma radiation resulting from said neutron irradiation by selectively detecting gamma radiation emitted by activated fluorine to the exclusion of lower energy gamma radiation which may be present. Since the present method involves an activation type technique, the gamma radiation indicative of fluorine is detected subsequent to irradiation of the unknown material by the neutron source. This may be accomplished by irradiating the sample of material with neutrons from the source, removing the source and thereafter selectively detecting the gamma radiation indicative of fluorine. In accordance with another embodiment of the invention the activation analysis may be accomplished by utilizing an appropriate source of neutrons, such as an electronic source involving a particle accelerator, for example, which may be operated in a gated or pulsed manner. In the latter case, the source is turned on in order to irradiate the sample under analysis, then switched off and the detector switched on in order to detect delayed gamma radiation in the absence of prompt gamma radiation which might be emitted from the sample during irradiation by the source.

In accordance with a further aspect of the present invention there is provided a radioactivity well logging instrument comprising an elongated instrument adapted to be passed through a borehole for determining the presence of fluorine in the formations traversed by the borehole. The instrument includes a source of neutrons for irradiating the formations and a detector of gamma radiations emitted in the borehole as a result of the irradiation. The source provides neutrons of the specified energy range, i.e., neutrons in a range of at least about 3 mev. and having a maximum value of about 10 mev. The logging instrument also includes a gamma radiation detector of the proportional type, advantageously being a scintillation type detector having an output signal proportional to the photon energy of the detected gamma radiation. The detection instrument further includes means for biasing the detector to detect gamma radiation only above a predetermined energy threshold of about 4 mev. The source and detector are spaced from one another along the longitudinal axis thereof so that the detector is beyond the influence of the source during irradiation of the sample, and during the detection interval the detector is located near the irradiated sample to detect gamma radiation emitted therefrom due to activated fluorine.

In accordance with a still further embodiment of the present invention, the logging instrument is provided with means for selectively changing the spacing or distance between the source and a detector, by moving the source closer to or farther away from the detector. In this way the source and the detector (in non-sensitized condition) may be positioned near the sample to be irradiated and then, after irradiation of the material under investigation, the source may be removed from the vicinity of the irradiated sample and the detector. At the same time the detector is re-sensitized, thereupon starting to detect gamma radiation indicative of fluorine.

For additional objects and advantages and for a better understanding of the invention, attention is now directed to the following description and accompanying drawing. The features of the invention which are believed to be novel are particularly pointed out in the appended claims.

In the drawing:

FIG. 1 is a side elevational view, partly in cross-section, showing schematically a portion of a borehole in the earth having suspended therein an instrument for conducting a fluorine log of the material comprising the earth formations along the borehole in accordance with principles of the invention;

FIG. 1A is a side elevational view partly in cross-section illustrating schematically and in enlarged form a portion of the radiation detector apparatus contained within the logging instrument shown in FIG. 1;

FIG. 2 is a side elevational view similar to FIG. 1 which illustrates a further embodiment of the logging instrument shown in FIG. 1;

FIG. 3 schematically illustrates the decay scheme of $N^{16}$ to $O^{16}$;

FIG. 4 is a graphic representation showing a plot of the gamma counting rate versus time during operation of the instrument illustrated in FIG. 2;

FIG. 5a is a graphic representation showing a plot of gamma counting rate versus time, corresponding to a portion of the plot shown in FIG. 4, as illustrative of the type of signal obtained with one type of formation;

FIG. 5b is a graphic representation similar to FIG. 5a, but showing the type signal obtained for another type formation;

FIG. 5c is a graphic representation similar to FIGS. 5a and 5b, but shows the type signal detected for still another type formation; and FIG. 5d is a graphic representation similar to FIGS. 5a, 5b and 5c, but showing the type signal obtained for yet another type formation.

Referring now to FIG. 1 of the drawing, there is shown a borehole 10 traversing a plurality of earth formations 11, 12, 13, and 14. Suspended within the borehole 10, as by means of a cable 16, there is shown a well logging instrument 17 constructed in accordance with the principles of the invention for determining the fluorine content of the earth formations traversed by the borehole, as herein described. The cable 16 may include an outer conductive sheath together with one or more additional inner conductors (not individually shown) in order to afford means for transmitting electrical power and signals between the instrument 17 and electrical equipment at the surface of the earth.

The surface equipment provides means for receiving signals transmitted over the cable 16 from the logging instrument 17 and for recording the received signals. More particularly, the surface equipment includes a pulse pick-off circuit 21 comprising appropriate filter means for separating pulse type signals received over the cable 16 from the logging instrument 17 from alternating power transmitted down the cable 16 from the power source 22 to the logging instrument 17. The output of the pulse pick-off circuit 21 is coupled to a ratemeter 23 which operates in known manner to provide an output signal which varies according to the intensity, i.e., rate-of-occurrence of the pulses applied thereto from the pulse pick-off circuit 21. It is to be understood that the surface equipment may include appropriate signal amplifying means and the ratemeter 23 may include appropriate pulse shaping or pulse equalizing means and may further include an appropriate integrating circuit having a predetermined time constant together with an appropriate rectifier circuit for providing an output in the form of a varying DC whose voltage varies in amplitude according to the rate of occurrence of the detected radiation. The output of the ratemeter 23 is shown coupled to a recorder 24 for providing a continuous record of the intensity or rate-of-occurrence of the detected radiation. The surface equipment further includes means indicated schematically as a wheel 18 having its perimeter in contact with the cable 16 for continuously measuring or determining the amount of cable supporting the instrument 17 in the borehole, thereby providing means for measuring the location of the instrument in the borehole throughout the logging operation. Depth measuring device 18 may be of a conventional type having an electrical output signal and is shown having a signal output coupled over a conductive cable 25 to the recorder 24 in order to provide means for correlating the record of the intensity of the detected radiation with the position of the logging instrument 17 in the borehole 10 throughout a logging run.

The logging instrument 17 comprises an elongated outer shell-like housing or casing 30 formed conventionally of material such as steel in accordance with known techniques to withstand the pressures and temperatures commonly encountered in well logging operations. Advantageously, the housing should be of such character as to withstand the conditions that may be found in boreholes which may be upwards of 10 to 20 thousand feet in depth.

The casing 30 contains a neutron source 31 for irradiating the earth formations along the borehole with neutrons and also includes appropriate radiation detection equipment for detecting gamma radiation induced in an activated sample of earth formation as the result of irradiation by the neutrons from the source. Appropriate electrical circuitry is also enclosed within the casing or housing 30 for amplifying and otherwise handling the output signals in the radiation detection equipment for transmission of the signals over the cable 16 to the surface equipment.

The neutron source 31 is shown positioned within the upper end of the housing 30 and surrounded by a neutron permeable shield 32 of lead or tungsten, for example, to prevent gamma radiation which may also be emitted thereby from passing either directly or indirectly to the detection equipment. In the case where the neutron source emits substantially no undesirable gamma radiation, as hereinafter explained in greater detail, it is contemplated that the gamma-ray shielding material may be omitted. Below the gamma-ray shielding material 32 and between the source 31 and the radiation detection equipment located below it in the housing 30 there is provided a second shield 33 formed of materials such as borax and Lucite, for example, for preventing neutrons from the source from diffusing down the logging tool case toward the detector.

At the lower end of the instrument 17 within the housing 30 and spaced from the source 31 at a distance S1 there is shown a radiation detecting unit 34, further details of which are shown in FIG. 1A, and which provides means for detecting the gamma radiation emitted upon activation of fluorine as a result of irradiation thereof by neutrons from the source 31. The radiation detection unit 34 may advantageously comprise a scintillation type proportional detector including a luminophor and a photomultiplier tube together with an appropriate preamplifier. The output of the radiation detector unit 34 is shown coupled to a discriminator 35 which provides means for selecting output signals from the detector unit 34 which are an indication of gamma rays of predetermined energy while discriminating against other detector output signals indicative of gamma radiation of different energy value, as hereinafter discussed in greater detail.

The output of the discriminator 35 is shown coupled to electronics unit 36 and which represents such other circuit equipment as may be required for transmitting the output signal from the detector and discriminator to the surface electronic equipment, as well as the equipment which may be required for providing appropriate electrical power for the discriminator and detector. It is to be understood that the electronic equipment 36 may include means for transmitting the output of the detector to the surface over the cable 16 either in the form of a frequency modulated signal, or in the form of pulses of varying amplitude, or in such other signal form as may be within the skill of those familiar with this art. It is to be further understood that the electronic equipment 36 may also include means for rectifying alternating current power transmitted down the cable from the power source 22 in order to provide the required operating potentials for the other electrical equipment including the detector 34 and discriminator 35, as well as to operate the electronic equipment 36 which may include an amplifier or frequency modulation devices as well as other types of pulse transmission equipment. Moreover, it is to be understood that the discriminator may be included in the surface electronic equipment, rather than in the logging instrument 17, provided the logging instrument included means for sending signals up the cable to the surface which signals vary according to the amplitudes of the scintillation signals corresponding to radiation of different energies.

Referring now to FIG. 1A there is seen in greater detail a preferred form of detector for use in the logging apparatus 17 shown in FIG. 1. In particular, the detector 34 comprises a thermally insulating chamber 40 advantageously in the form of a Dewar flask including an outer wall 41 separated from an inner wall 42 by an evacuated space 43. It is also contemplated that wall or walls of the insulating chamber may be formed of an insulating material such as metalized Mylar. The insulating chamber 46 is provided with an appropriate removable insulating cover plug 44. Within the Dewar flask comprising the insulating chamber 46, advantageously affixed to the inside of the insulated cover plug 44, there is provided a coolant chamber 45 which may be formed of heat conducting material such as aluminum and which contains a quantity of coolant materials such as ice 46. The coolant chamber 45 including the ice 46 affords means for maintaining the scintillation detection equipment in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted Feb. 18, 1958 to Gerhard Herzog. It is also contemplated that a so-called high temperature photomultiplier tube may be employed in the scintillation detector, thereby avoiding the necessity of using the above systems for insulating and cooling the scintillation detector.

Within the insulated chamber 40 and below the coolant chamber 45 there is shown the scintillation detection equipment comprising a gamma radiation sensitive luminophor 50 contained within a conventional protective container 51 which may be formed of aluminum in order to protect the luminophor from moisture and physical damage. The upper end of the container 51 is exposed to the light sensitive portion of a photomultiplier 52. It is to be understood that the luminophor container 51 may be sealed with a transparent cover of glass or plastic in a manner known to those skilled in the art and which serves to protect the luminophor from moisture while providing appropriate optical coupling between the luminophor 50 and the photo-sensitive surface of the photomultiplier 52. The photomultiplier 52 is shown adjacent and mounted to a preamplifier 53 for amplifying and coupling the output of the photomultiplier to appropriate circuit means including the discriminator 35 shown in FIG. 1.

In carrying out the analysis of a sample for fluorine in accordance with applicant's invention, it is contemplated to perform a selective activation and detection process whereby fluorine 19, which is the only naturally occurring isotope of fluorine, is exclusively monitored. The activation steps of the selective activation and detection process consists in the use of a neutron source which advantageously subjects the sample to fast neutrons having energy in the range of more than approximately 3 mev. and less than approximately 10 mev. Under these conditions of activation fluorine 19 is the only element which will be activated having a half life greater than a few tenths of a second and emitting gamma radiation greater than about 6 mev. The detection step of the selective activation and detection process consists in operating the radiation detector, as by appropriate biasing, in order selectively to detect only gamma radiation having an energy value above a predetermined value below which interfering gamma radiation may be encountered. It has been determined that an appropriate detector bias is of the order of 4 mev., in order to exclude interfering gamma radiation of lower value.

It is contemplated that a plutonium-beryllium neutron source which emits neutrons having a maximum energy of 10.6 mev. may be employed. It is further contemplated that an actinium-beryllium or polonium-beryllium neutron source having a maximum energy of 10.8 mev. is satisfactory and may be employed.

The luminophor of the scintillation detector may be substantially any gamma radiation sensitive luminophor which provides an output pulse proportional to the energy of the detected gamma radiation such for example as sodium iodide, cesium iodide or a plastic luminophor sensitive to gamma radiation.

The analysis upon which the subject invention is based involves the following reaction:

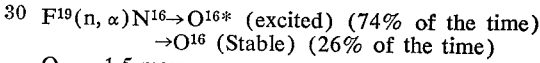

$$Q = -1.5 \text{ mev.}$$
$$T_{1/2} \text{ (half life)} = 7.37 \text{ seconds.}$$

The decay scheme for $N^{16}$ to $O^{16}$ is illustrated in FIG. 3 of the drawing.

Referring especially to FIG. 3 of the drawing, it may be seen that $N^{16}$ decays by meta emission to $O^{16}$ with the transition probabilities indicated. For example, 5% of the time it can be expected that $N^{16}$ will decay to the 7.12 mev. energy level of $O^{16}$. The vertical wave-like lines crossing the $O^{16}$ energy levels indicate transitions between levels of the $O^{16}$ nucleus, the starting and ending points of the arrows denoting the particular levels between which the transitions are made. For example, the 8.88 mev. level decays to the ground state through the intermediate levels indicated. If the 8.88 mev. level decays to the ground state through the 6.14 mev. level, then both a 6.14 mev. and a 2.74 mev.

$$(8.88 - 6.14 = 2.74)$$

gamma quantum are emitted. The lifetimes of the 8.88 mev. and 6.14 mev. levels are very short, being of the order of $10^{-11}$ sec. or less, and are negligible compared to the 7.37 sec. half-life of the $N^{16}$. Thus these gamma rays appear for all practical purposes to be emitted by a source which has a 7.37 sec. half-life.

The neutron-alpha reaction with fluorine has a cross section which rises sharply at 3 mev. neutron energy to an average value of 150 millibarns for 4 to 6 mev. neutrons. The $N^{16}$ which is produced by this reaction decays as set forth in the preceding paragraph with a 7.37 sec. half-life to $O^{16}$, most of the transitions going to excited states of $O^{16}$. The excited states of $O^{16}$ decay almost immediately with the emission of gamma rays, and these gammas have energies predominantly in excess of 6 mev.

It is noted that the reaction $O^{16}$ (n, p) $N^{16}$ also may lead to $N^{16}$. However, the Q value for this reaction is −9.619 mev. The practical threshold would be on the order of 1 mev. higher than this which is approximately 10.6 to 10.8 mev. Thus, the aforementioned plutonium-beryllium, actinium-beryllium, or polonium-beryllium neutron sources having a maximum energy of 10.6 or 10.8 mev. would be appropriate.

In summary, therefore, the neutron source should have an energy emission characteristic in the range of 3 to nearly 11 mev. and the gamma ray detector should be biased to detect gamma rays of the order of 4 mev. and higher. In accordance with a further specific embodiment, the detector may comprise means such as a pulse-height analyzer for selectively detecting only the gamma radiation corresponding to the specific radiation levels of $N^{16}$ (6.14, 6.92 and 7.12 mev.) and especially the 6.14 mev.

It is contemplated that the present invention may be carried out with the apparatus shown in FIGURE 1 by detecting gamma radiation continuously while the sample is being irradiated with neutrons from the source as the logging instrument is moved upwardly through the borehole so that the neutron source in the upper end of the instrument precedes the gamma radiation detector through the borehole. Thus, the fast neutrons from the source are caused to irradiate successive samples of earth material in situ along the borehole to activate fluorine 19 which may be present, and after the neutron source has moved away from the activated sample, the gamma radiation detector arrives to detect the activated fluorine gamma radiation. In such a log a practical logging run can be made for the presence of commercial deposits of fluorine in forms such as fluorspar (calcium fluoride) wherein the sought-for deposits may be present in concentrations of the order of 25–35%. However, where a higher degree of sensitivity is required or desirable, it is contemplated that the logging method may advantageously be carried out by detecting the gamma radiation emitted by activated fluorine after the source radiation is removed either by physical separation of the source from the sample after activation of the sample or by switching the source off and the detector on after activation of the sample using apparatus such as that illustrated in FIGURE 2 wherein those elements corresponding to the apparatus in FIGURE 1 are identified with similar reference numerals bearing a primed designation.

Referring now to FIGURE 2, there is shown apparatus generally like that of FIGURE 1 but which is further provided with means in the logging instrument for moving the neutron source closer to or further away from the radiation detector 34' as desired. The apparatus of FIGURE 2 also includes a source position motor control at the surface for selectively varying the spacing within the logging instrument between the neutron source and gamma radiation detector.

In the apparatus of FIGURE 2, the neutron source 31' is shown mounted to an endless belt 60 shown passing over a pulley wheel arrangement including a lower pulley 61 coupled in driving relationship to a motor 62 shown coupled as by means of cable conductor system 63 over the cable 16' to a source-position motor control 70 located at the surface. The belt 60 is shown passing over additional pulley wheels 64 and 65 shown within the housing 30' above the lower pulley 61 and below the shields 32' and 33'.

In FIGURE 2 the source 31' is shown at a source-to-detector spacing S2 which is an intermediate spacing in the range S3 throughout which the source may be moved vertically in order to change its spacing from the detector 34'.

Whereas with the apparatus of FIGURE 1 the log would be conducted with the logging instrument being withdrawn or moved upwardly through the borehole, i.e., so that the source will precede the detector as the instrument passes through the bore hole, the apparatus of FIGURE 2 contemplates that the log would be made while the instrument is being lowered into the borehole. In such instance the source may be located at the upper position, i.e. closest to the detector 34' as indicated by the distance S4 which may be of the order of say 6 inches between source and the end of the detector luminophor. The source may be maintained in the position indicated by the spacing S4 for 6 seconds then moved to the position at the bottom of the logging instrument indicated by the spacing S5. The spacing S5 may advantageously be of the order of eight (8) feet between source and detector, thereby assuring that the detector is spaced from the source beyond the range of substantially all prompt neutron induced gamma radiation occurring in the vicinity of the source. With the source maintained at the position S5 the gamma radiation counting rate is recorded to provide the desired fluorine content measurement at the given location in the borehole where the earth formations were irradiated by neutrons from the source for the given irradiation interval.

It is contemplated that either stationary or continuous logs could be run in the foregoing manner.

It is further contemplated that such a logging run, with the source maintained at a spacing such as S1 in FIG. 1 or S5 in FIG. 2 say of the order of eight (8) feet between source and detector, the source would pass the detection zone in order to accomplish the desired activation of fluorine in the formation and as the logging instrument is moved onwardly through the borehole the detector would thereafter be exposed to the irradiated portion of the borehole from which the activated fluorine indicating gamma radiation would be emitted. This may be accomplished by selecting the appropriate logging speed indicated above say of the order of thirty-two (32) feet per minute. With a spacing of 8 feet and a logging speed of 32 feet per minute the detector will arrive at the irradiated portion of the borehole after the occurrence of prompt neutron-gamma radiation, but before activated fluorine has decayed beyond two half lives.

In accordance with the present invention, it has been determined that the optimum logging speed through the borehole can be determined quite exactly through rather complicated calculations which are substantially approximated by relatively simple calculations as follows:

The accumulation of activated nuclei (N) for zero initial activation, is given by:

(1) $$N = \frac{P}{\lambda}(1 - e^{-\lambda t})$$

where

P is a constant
$\lambda$ is the decay constant
K is the time

Assume a point source and an activation volume in the borehole which extends vertically for a dimension $a$, which is constant within $a$ and which is zero outside $a$. Then the time for the source to pass through such a volume is (2) $$t = a/V$$

From (1) and (2)

(3) $$N = \frac{P}{\lambda}\left(1 - e^{-\frac{\lambda a}{v}}\right)$$

If a point detector is assumed, and the dimensions of the volume from which radiation from activated nuclei reaching the detector is small relative to the source to detector spacing, $d$, then the activated nuclei detected by the detector are those left after decay which will take place during a time determined by the velocity ($v$) of the logging tool and $d$.

Thus, the number of activated nuclei detected $N_{AD}$ will be (4) $$N_{AD} = \frac{P}{\lambda}\left(1 - e^{-\frac{\lambda a}{v}}\right)e^{-\frac{\lambda d}{v}}$$

From (4) it is seen that the optimum value of $d$ would be zero since then the second exponential would be unity. However, this is impractical since $d$ should be greater than $a/2$. In actual practice it should be longer to decrease the prompt gamma component and other reasons. A minimum distance of 2 to 5 feet is practical.

By taking the derivative of (4) with respect to $v$ and using $\lambda = .69\tau$, where $\tau$ is the half life, one can show that $N_{AD}$ is a maximum for:

(5)
$$v = \frac{.69a}{\tau \ln\left(\frac{d+a}{d}\right)}$$

For fluorine the half life is approximately .12 minute. It is known from measurements that $a$ is approximately one foot. Thus, approximately, (6)
$$v = \frac{5.9}{\ln\left(\frac{d+1}{d}\right)}$$

The following table shows the optimum value of $v$ for various spacings, D, and the relative number of activated nuclei detected ($N_{AD}$).

| $d$ in feet | 2 | 3 | 4 | 5 |
|---|---|---|---|---|
| $v$ in ft./min | 14.9 | 20.5 | 26.5 | 32.3 |
| Relative $N_{AD}$ | .148 | .105 | .082 | .068 |

It is seen that the optimum conditions are for shorter spacings and lower velocities. Two feet is close to the shortest spacing which would be desirable. The downward optimum logging speed would be 15 ft./min., using a logging instrument with the source located 2 ft. below the detector, such as the apparatus illustrated in FIG. 2 of the drawing. When a spacing as close as 2 feet is employed, the detector will also be subjected to a prompt neutron-gamma component along with the delayed activation gamma component. Accordingly, this aspect of the invention utilizing relatively close source to detector spacings wherein the detector is subjected to both the delayed activation gammas and the prompt neutron-gammas advantageously involves the running of a second log of the prompt gamma component, which is subtracted from the combination log containing both the delayed activation gamma component and the prompt gamma component. Accordingly, using apparatus such as that illustrated in FIG. 2 with the source mounted below the detector, the correction for the prompt neutron gamma component can be made by conducting a log going up the borehole at 15 ft./min. which would then be subtracted to determine the activation component.

It is seen from the foregoing that both logs would have a prompt neutron-gamma component and by subtracting the second log from the first we can thereby obtain a delayed activation gamma log from which the prompt neutron-gamma component has been eliminated.

Although the optimum logging speed and spacing has been discussed with reference to the apparatus illustrated in FIG. 2 wherein the source is mounted below the detector and wherein the source may be moved relatively closer to or further from the detector, it is noted that the optimum logging speed may be determined for apparatus wherein the source-detector spacing is fixed as shown in the apparatus in FIG. 1.

When using apparatus such as that of either FIG. 1 or FIG. 2 with a relatively long source-detector spacing such that the detector is spaced of the order of 8 feet from the source thus substantially out of range of the prompt neutron-gamma radiation induced by the source, it is not necessary to conduct a second log to determine the prompt-neutron gamma component.

In view of the above, it is seen that two different techniques of logging are contemplated in accordance with the present invention. In accordance with one technique, herein referred to as a long-spaced activation log, the recommended source-detector distance is greater than the range of prompt neutron gamma radiation and offers the benefit that no additional prompt gamma log needs to be run and subtracted therefrom. The second technique, herein referred to as a short-spaced activation log, offers the advantage of obtaining a greater activation signal, but involves the running of an additional prompt gamma ray log which is subtracted from the combined log comprising both the activation gamma component and the prompt neutron gamma component.

The logging apparatus of FIG. 2 can be employed to conduct a so-called stationary log at various locations along a borehole by passing the logging instrument 17' through the borehole and by stopping the logging instrument 17' at successive locations along the borehole and making an analysis at each of such locations by selectively moving the source close to the detector for the irradiation interval and thereafter moving the source away from the portion of the formation comprising the sample and the detector for the detection interval. It is to be understood that when the apparatus of FIGURE 2 is operated in this manner, i.e., by moving the source closer to the detector during irradiation, then away from the detector during detection, it becomes necessary to provide for operation of the recorder chart drive means even though the logging instrument 17' may be held stationary in the borehole 10'. This may be accomplished by turning on the recorder chart during the detection interval when the source 31' is moved away from the detector 34' by means of the source position motor control 70.

Utilizing the apparatus illustrated in FIG. 2 with the source in the irradiating position S4 close to the detector for a period of six seconds and a plutonium-beryllium source having an intensity of $10^7$ neutrons per second and using a two inch by four inch sodium iodide crystal in the detector, a one per cent occurrence of calcium fluoride would give approximately twenty-five (25) radiation counts in a six (6) second detection period with the source removed to a remote position, such as S5.

The above-described well logging method using fixed spacing between the source and the detector, as with apparatus such as that shown in FIG. 1, yields a continuous log which is of relatively low sensitivity as compared to the type of log, also described above, wherein the spacing between the source and detector is changed to a different spacing for the irradiation interval as compared with the spacing for the detection interval. More particularly, the method of logging with changing source to detector spacing gives the greater sensitivity, assuming that the activated sample is close to the detector crystal and that the source is removed rapidly with respect to the half life of the activated material, i.e. seven seconds in the case of fluorine activation as herein described. This is, in a sense a point measurement, or at least involves a relatively small sample volume.

The foregoing technique of analysis may be employed to analyze surface samples as well as earth samples in situ along a borehole. For example, apparatus such as that shown in FIG. 2 may be employed to irradiate a sample of material such as an earth sample, e.g. a core sample, by placing the sample to be analyzed in the vicinity of the detector near the source when in the position S4 during the irradiation interval, which may be of the order of say six seconds, thereafter moving the source away from the detector and sample to the position S5 and detecting radiation emitted from the sample during a detecting interval while the source is beyond the influence of the sample and detector. In such instance additional shielding should be employed to protect the operator from the source radiation.

In a typical illustration of a surface analysis using the foregoing technique, a sodium iodide detector crystal one inch in diameter by three inches long was employed with a detector biased to detect only gamma radiation of above 3 mev. A calcium fluoride sample one inch in diameter by two inches long was then activated for several half lives using a plutonium-beryllium neutron source having an intensity of $10^6$ neutrons per second. After a period of five and one-half seconds the calcium fluoride was placed adjacent to the sodium iodide crystal. During a detection interval lasting throughout the next thirty seconds there was an increase in the detected radiation above background of 81 counts. By using a source of $10^7$ neutrons per second and a sample having dimensions of two inches in diameter by three inches long, a two percent occurrence of calcium fluoride is easily measured to within an accuracy of ±10% in a detection period of about three minutes with the one by three inch sodium iodide detector crystal. A logging tool such as that illustrated in FIG. 2 including means for moving the source up and down and using a sodium iodide crystal will give accuracy of the same order of magnitudes.

In like manner, a particle accelerator apparatus may be employed to produce the desired neutrons to conduct such analysis at the surface or in a borehole during logging. In this event the source may be employed to operate during a predetermined irradiation interval and the detector may be operated during the subsequent detection interval as discussed above.

It is further contemplated that apparatus of the type illustrated in FIGURE 2 of the drawing comprising means for changing the spacing between the source and detector may be employed to conduct a well log by continuously moving the entire logging instrument slowly through the borehole while nevertheless positioning the source close to the detector during the irradiation interval and thereafter moving the source away and holding it away from the detector during the detection interval. This sequence of events may be repeated as the logging instrument is moved slowly along the borehole, thereby analyzing successive samples of earth formation along the borehole. In any event, each sample of formation to be analyzed along the borehole should be subjected to sufficient irradiation to activate fluorine which may be present in the sample, and the detector should thereafter by positioned in the vicinity of the irradiated sample for a time interval of the order of at least 1 or 2 half lives of the activated fluorine for detecting the gamma radiation indicative of the activated fluorine. During this detection interval, the source should be removed sufficiently far away from the detector to eliminate the influence of prompt neutron induced gamma radiation on the detector. As discussed above, the source should advantageously be of the order of about 8 feet away from the detector during the detection interval.

The present invention further contemplates a novel method of logging which combines certain advantages of both the fixed and the variable source to detector spacing methods of activation logging. Advantageously this combination logging technique should be carried out in the following manner. Using apparatus such as that of FIG. 2, the logging instrument 17′ is moved downwardly through the borehole 10′ with a velocity $v$ and the source 31′ is moved rapidly within the logging instrument 17′ from the remote position S5 to the intermediate position S2. At this instant the source 31′ would be opposite some point A defining the sample in the formation 13′ along the borehole 10′. Then the source 31′ is moved with the same velocity $v$ from the intermediate position S2 to a closed position S4. Thus, it is seen that by moving the source 31′ upwardly at the velocity $v$ the source 31′ is maintained opposite the sample point A while the instrument 17′ is being moved downwardly in the borehole 10′ with the velocity $v$.

In accordance with this method, the intermediate spacing S2 and the close spacing S4 are arranged such that the time the source 31′ is opposite the sample point A will not be more than about two half lives of the activated isotope, which is about 14 or 15 seconds in the case of fluorine. The source 31′ is then moved rapidly back to remote position S5, following which the detector 31′, moving through the borehole with velocity $v$ in the logging instrument, 17′ will pass over the sample point A comprising the activated volume, and the activation radiation emitted from the sample at point A will be detected by the detector as a measure of the presence of the activated isotope sought for. This cycle of operation is then repeated as the logging instrument 17′ is passed downwardly through the borehole 10′.

In conducting an activation log for fluorine in accordance with the foregoing principles and as described immediately above, it has been found that the close spacing S4 may be 0.5 foot, the intermediate spacing S2 may be 2.5 feet, the long spacing S5 may be some distance beyond 2.5 feet preferably on the order of 7 or 8 feet. In such instance the logging speed may be 8 feet per minute such that the source 31′ would be in the vicinity of the sample point A for irradiating same for 15 seconds. In such instance the source 31′ may advantageously be removed to the remote spacing S5 and held there for about seven seconds. During this time the detector will pass over the activated volume comprising the sample point A and the logging signal will be at its peak. A time constant should be used for the logging system which is relatively short compared to the half life of the induced radioactivity. For example, in the case of the 7.37 sec. activity induced in fluorine one would use a time constant of about 1 second. In accordance with this logging technique, the foregoing cycle would be repeated so that the next activated volume at a sample point A′ would be $$2' + 7 \text{ sec.} \times \frac{8 \text{ ft.}}{60 \text{ sec.}} \approx 3'$$

below the first sample point A. Thus in accordance with this method of logging, the formation along the borehole would be sampled at 3 ft. intervals and logged at a speed of 8 feet per minute. A typical combination log in accordance with this technique is illustrated in FIG. 4 of the drawing.

Referring now to FIG. 4 of the drawing, it is seen that the logging signal occurring between the points S2 and S4, corresponding to the signal obtained when the source is positioned at spacings S2 and S4, respectively, as described above, would provide a prompt neutron-gamma ray log at the indicated spacings. More particularly, it is seen that the curved response indicating detected radiation intensity as the source moves from the position S2 to the position S4 would provide a record of the detected prompt neutron-gamma radiation flux or intensity, recorded as a function of source-to-detector spacing. This type of information, per se, is quite interesting and is of value both in itself and in correlation with the activation radiation signal obtained in accordance with the present method of logging as indicated in FIG. 4 and as described herein.

The portion of the signal labeled "source removed to S5" indicates the radiation signal detected in the borehole in the vicinity of the logging instrument with the source removed beyond its range of appreciable influence. This provides a measure of any background radiation to which the detector is sensitive. In the case of the aforementioned method of logging for fluorine, the logging detector bias is sufficiently high that natural gamma radiation is substantially excluded from the detected background radiation, however, for other activation logging techniques employing lower detector bias as hereinafter described, this portion of the logging signal provides an indication for the natural gamma radiation.

The activation radiation portion of the signal shown in FIG. 4 provides a measure, not only of the activation radiation e.g. fluorine, but also provides an indication of the hydrogen content of the portion of the formation comprising the activated sample. In particular, the peak $h$ of the activation signal provides a measure of the intensity of the detected radiation and thus a measure of the quantity of the activated isotope which is present. Thus, the height of the peak $h$ is a measure of the fluorine content in accordance with the aforementioned activation technique. In addition to the height of the activation signal $h$, the width $w$ of the activation signal provides a measure of the hydrogen content of the sample. In high hydrogen content zones the activation signal is relatively thin, due to the fact that a relatively large percentage of the neutrons are slowed down relatively close to the source due to the slowing down effect of the hydrogen. In this case the range of neutrons having the requisite high energy to activate the fluorine is only a short distance. For lower hydrogen content zones the activation radiation signal width $w$ is relatively broad, due to the fact that high energy neutrons are found ranging over a greater distance from the source. Various possible types of activation radiation signals are shown in FIGS. 5a, 5b, 5c and 5d.

In FIG. 5a a radiation signal is illustrated having a relatively high peak $h$, indicating a relatively high activation signal, i.e. high fluorine content in the method described. In FIG. 5a the width $w$ is relatively narrow indicating a relatively high hydrogen content zone.

In FIG. 5b an activation signal is shown wherein the activation peak $h$ is relatively low, indicating relatively a low fluorine content. In this case, moreover, the activation signal width $w$ is relatively broad or wide, indicating a relatively low hydrogen content as well.

In FIG. 5c, the activation fluorine signal $h$ is relatively low. In this figure, however, the activation signal width $w$ is relatively thin or narrow indicating a relatively high hydrogen content.

In FIG. 5d, the activation signal peak $h$ is relatively high indicating a high fluorine content and the activation signal width $w$ is relatively broad indicating a low hydrogen content.

It is contemplated that the combined method of continuous logging which is carried out with apparatus such as that of FIG. 2 by continuously moving the logging instrument through the borehole while nevertheless changing the spacing between the source and detector to provide a log such as that shown in FIG. 4 and FIGS. 5a through 5d may advantageously be employed to conduct activation type logs other than the selective measurement of fluorine as hereinabove set forth. For example, this novel combination logging technique may be employed to conduct a log for aluminum or silicon.

A log may be conducted for silicon by fast neutron activation of silicon 28 by the reaction $Si^{28}$ (n, p) $Al^{28}$ (unstable) and which has a threshold of approximately +4.5 mev. This same unstable product nucleus $Al^{28}$ may be obtained from thermal neutron capture in $Al^{27}$.

Aluminum 28 (unstable) decays with a 2.3 minute half life by beta emission to $Si^{28}$ (excited) which, in turn, decays by gamma emission to $Si^{28}$ (stable) by a direct transition from the 1.78 mev. level.

The silicon in sandstone may be thus activated by fast neutrons in accordance with the foregoing reaction. The resulting induced activity decays with a 2.3 minute half life. A plutonium-beryllium neutron source as described above is suitable for conducting such a fast neutron activation log for silicon. By way of example, a logging instrument provided with a plutonium-beryllium neutron source having a strength of $10^7$ neutrons per second may be maintained opposite the formation for an interval of about four minutes to activate silicon in the formation. After a delay of about 20 seconds, the activation may then be monitored for a period of about 10 minutes. The radiation detecting instrument should have a significantly shorter time constant than the time constant of the decaying radiation being monitored. A detector time constant of 10 seconds is appropriate.

Obviously, other modifications and variations of the invention as hereinbefore set forth may be made without departing from the spirit and scope thereof, and therefore, only such limitations should be imposed as are indicated in the appended claims.

I claim:

1. A method of analyzing a sample of material suspected of containing fluorine which comprises irradiating said sample with fast neutrons in order to subject said sample to neutrons having energies substantially entirely within a range from 3 mev. to about 10 mev. in order to selectively activate fluorine 19 which may be present in said sample and thereafter selectively detecting gamma radiation emitted from activated fluorine 19 having a half life of the order of about 7 seconds to the substantial exclusion of prompt gamma radiation emitted from said irradiated sample as a result of said irradiation and to the exclusion of lower energy gamma radiation which may be present.

2. The method of claim 1 wherein the selective detection of said gamma radiation involves the detection of gamma radiation above a predetermined energy threshold of about 4 mev. to the substantial exclusion of gamma radiation below said threshold.

3. The method of claim 2 wherein the selective detection of gamma radiation involves selectively detecting substantially only gamma radiation which consists essentially of the 6.14 mev. gamma radiation emitted by the decay of $O^{16}$ to the ground state.

4. The method of conducting a log of earth formations along the traverse of a borehole to determine the presence of fluorine in said formations which comprises the steps of irradiating a sample of said formations with neutrons substantially entirely within a predetermined energy range having a lower limit of about 3 mev. and having an upper limit of about 10 mev. by passing a source of neutrons through the borehole which emits neutrons in said range and after irradiation of said sample and formations prior to substantial decay of activated fluorine in the irradiated sample selectively detecting gamma radiation above a predetermined threshold of the order of about 4 mev. which is emitted from activated fluorine as a result of said irradiation.

5. The method of claim 4 further characterized in that the radiation detecting step is carried out with a detector which is maintained spaced from the source of irradiating neutrons beyond the substantial influence of gamma radiation emitted from the source and irradiated sample of earth formations during irradiation of the formations by neutrons from the source.

6. The method of claim 5 wherein said source is moved through the borehole at a slow and relatively constant velocity.

7. The method of claim 4 further characterized in that the radiation is detected by passing a detector slowly through the borehole at a relatively constant velocity and wherein the formations are irradiated with a source of neutrons which is alternately positioned relatively close to the source during irradiation of a sample to be analyzed and then moved to a relatively remote position relative to the detector during intervals when said gamma radiation is being detected.

8. A method of conducting a log of earth formations along the traverse of a borehole to determine a characteristic of said formations which comprises the steps of passing a source of neutrons through said borehole to irradiate the formations along the borehole and detecting in said borehole gamma radiations emitted from said formations as a result of said neutron irradiation, the improvement wherein said formations are irradiated with said neutrons to activate gamma radiation emitting isotopes in said formation and wherein said gamma radiation detector is spaced from said neutron source and the earth formation adjacent said source a distance which is effectively beyond the range of prompt neutron-gamma radiation emitted from said formation as a result of said irradiation, wherein said neutron source and detector are moved simultaneously through said borehole with the source preceding the detector by said predetermined distance, and wherein said source and detector are moved through the borehole at a logging speed whereby the detector arrives opposite an irradiated portion of the formation after the substantial decay of prompt neutron-gamma radiation emitted from said formation due to said irradiation, and before a given preselected activated isotope has decayed beyond two half lives.

9. The method of claim 8 wherein the logging speed is defined substantially by the formula;

$$v = \frac{.69a}{\tau \ln\left(\frac{d+a}{d}\right)}$$

where $a$ is the vertical dimension of the activation volume in the borehole, where $\tau$ is the half life of the preselected sought-for isotope; and where $d$ is the source-to-detector spacing.

10. The method defined in claim 9 wherein the preselected sought-for nuclei is activated fluorine 19.

11. The method of logging a borehole traversing earth formations involving the steps of passing a source of neutrons through the borehole to irradiate earth formations along the borehole and passing a gamma radiation detector through said borehole to detect gamma radiation emitted from isotopes resulting from said radiation, the improvement wherein said radiation source is alternately positioned at a first position adjacent said detector and at a second position relatively remote from said detector, said first position being within the effective range of prompt neutron-gamma radiation emitted from an irradiated formation in the vicinity of said source, said second position being beyond the effective range of said prompt neutron-gamma radiation.

12. The method of conducting a log of earth formations along the traverse of a borehole which comprises the steps of irradiating a region of said formations opposite a selected point in said borehole for a time sufficient to activate at least one gamma-radiation emitting isotopes which may be present in said formations, discontinuing said irradiation and thereafter passing a radiation detector through the borehole opopsite said region to detect gamma radiation occurring in said borehole as a result of activation of gamma radiation emitting isotopes due to said irradiation, and recording a signal indicating the intensity of the detected radiation over a given interval including at least a portion of said region in correlation with the position of said detector throughout said interval, whereby said signal indication shows the radiation intensity vs. distance from said irradiation point.

13. The method of clam 12 further including the additional step of detecting the prompt neutron gamma radiation occurring in said borehole during said neutron irradiation.

14. The method of claim 13 further including the additional step of detecting the naturally occurring gamma radiation in the vicinity of said irradiation point prior to irradiation thereof in order to provide an indication of the naturally occurring gamma radiation at said location.

15. The method of claim 12 wherein said preselected radiation emitting isotope is fluorine 19.

16. The method of conducting a log of earth formations along the traverse of a borehole which comprises the steps of irradiating a region of said formations opposite a selected point in said borehole for a time sufficient to activate at least one preselected gamma radiation emitting isotope which may be present in said formations, discontinuing said irradiation and thereafter passing a radiation detector through an interval of said borehole adjacent said irradiated region of said formation in order to scan the intensity of the gamma radiation emitted by activated nuclei due to said irradtion, and recording a signal showing the intensity vs. distance of the radiation detected throughout said interval in order to show the distance over which said activation extends along said borehole as a result of said irradiation.

17. The method of radioactivity well logging which comprises passing a radiation detector through a borehole at a given relatively constant velocity $v$, simultaneously passing a source on neutrons through said borehole ahead of said radiation detector to irradiate earth formations along the traverse of the borehole, while said detector is thus moving through said borehole at said velocity $v$, maintaining said source stationary at a given location in said borehole while irradiating earth formation opposite said point in said borehole thereby for a time interval sufficient to activate certain nuclei which may be present in said irradiated formation, after termination of said irradiation interval, and as said thus moving detector approaches said given location relatively rapidly removing said source away from said given location at a velocity that is rapid relative to said velocity $v$ to a relatively remote position ahead of said detector whereby said detector is placed out of range of prompt neutron-gamma radiation caused by irradiation of adjacent earth formations exposed to said source; while said source is thus removed to a remote position ahead of said detector detecting with said detector the radiation produced in the formation opposite said given location and recording a signal indicating the intensity of the detected radiation as said detector scans a region of earth formation opposite said location.

18. A method as defined in claim 17 further includes the additional step of detecting and recording a signal indicating the intensity of the prompt neutron-gamma radiation occurring in said borehole when said radiation detector approaches the vicinity of said neutron socrce while at said given location.

19. The method of radioactivity well logging defined by claim 16 further characterized in that said region of said formations is irradiated with neutrons having energies substantially entirely within a range from about 3 mev. to 10 mev. in order selectively to activate fluorine 19 which may be present in said region and wherein the radiation thereafter detected by said detector is gamma radiation in the range emitted by activated fluorine 19 to the substantial exclusion of lower energy gamma radiation which may be present.

References Cited

UNITED STATES PATENTS

| | | | |
|---|---|---|---|
| 2,463,733 | 3/1949 | Albaugh | 250—83.6 |
| 3,012,145 | 12/1961 | Erion et al. | 250—83.6 |
| 3,019,341 | 1/1962 | Monaghan | 250—83.6 |
| 3,184,598 | 5/1965 | Tittle | 250—83.3 |

ARCHIE R. BORCHELT, *Primary Examiner.*

U.S. Cl. X.R.

250—106